United States Patent [19]
Fujii

[11] 3,989,124
[45] Nov. 2, 1976

[54] DISC BRAKE FOR A BICYCLE
[75] Inventor: Yuji Fujii, Sakai, Japan
[73] Assignee: Shimano Industrial Company, Limited, Osaka, Japan
[22] Filed: Dec. 19, 1975
[21] Appl. No.: 642,592

[30] Foreign Application Priority Data
Dec. 24, 1974  Japan.................................. 49-3298

[52] U.S. Cl............................... 188/26; 188/71.1; 188/72.7
[51] Int. Cl.² ....................... B60L 3/02; F16D 55/22
[58] Field of Search.................. 188/26, 71.1, 71.3, 188/71.4, 72.2, 72.7, 72.9, 136

[56] References Cited
UNITED STATES PATENTS

| | | | |
|---|---|---|---|
| 2,612,968 | 10/1952 | Hood | 188/26 |
| 3,765,511 | 10/1973 | Toyomasu | 188/26 |

FOREIGN PATENTS OR APPLICATIONS

| | | | |
|---|---|---|---|
| 971,668 | 8/1950 | France | 188/26 |
| 1,171,287 | 11/1961 | Germany | 188/71.3 |

*Primary Examiner*—Duane A. Reger
*Attorney, Agent, or Firm*—Stevens, Davis, Miller & Mosher

[57] ABSTRACT

A disc brake for a bicycle or the like, which is provided with two arms opposite both surfaces of a disc rotatable with the bicycle wheel, which arms are pivotally supported to a fixed member to be freely swingable with respect thereto and shiftable toward the disc and carry pads directly attached to the arms. At least one of the arm and fixed member is formed of a recess which has a tapered face and receives a rolling member, such as a ball, into the recess. When the arms swing the rolling member rolls along the tapered face so that the arms may be shifted toward the disc and the pads be brought into contact with the disc to thereby exert the braking action.

7 Claims, 5 Drawing Figures

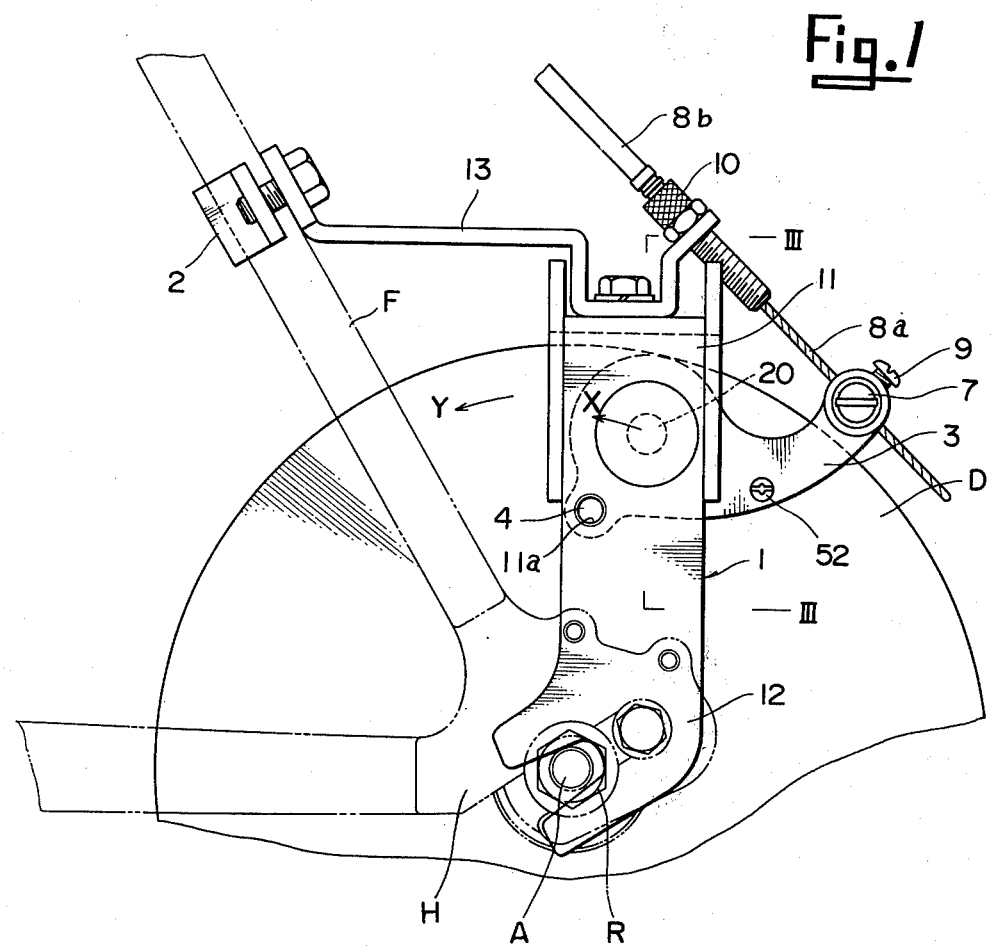

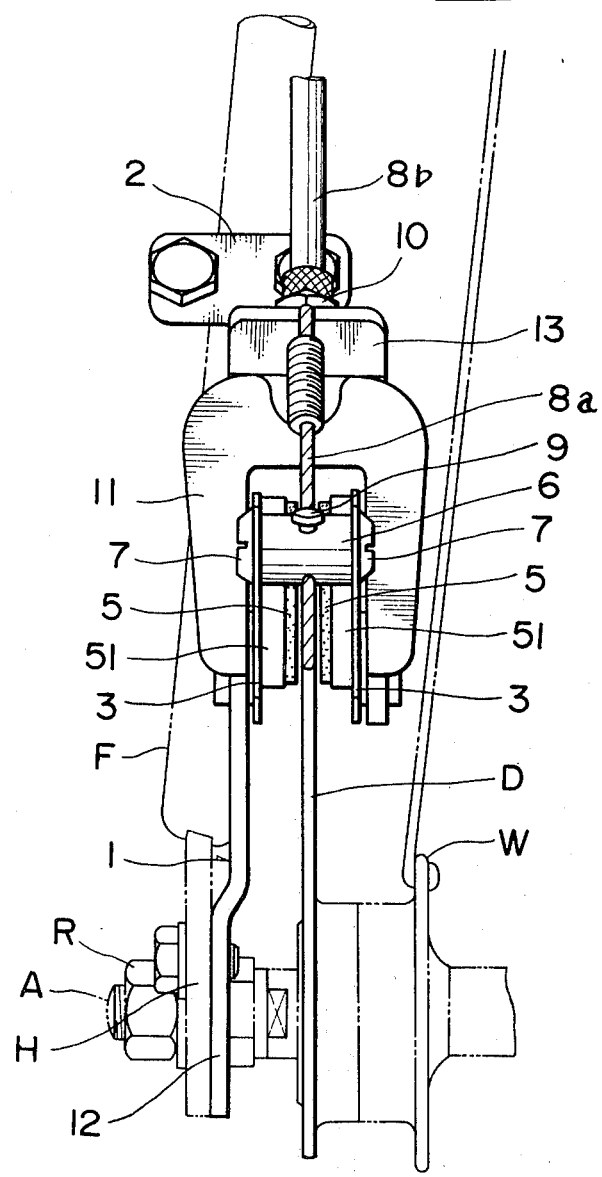

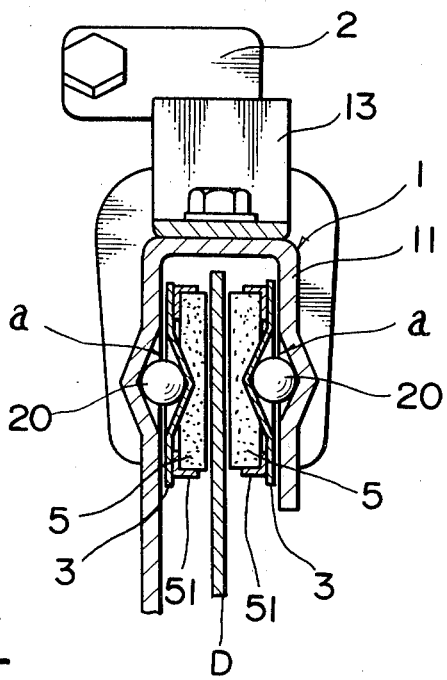
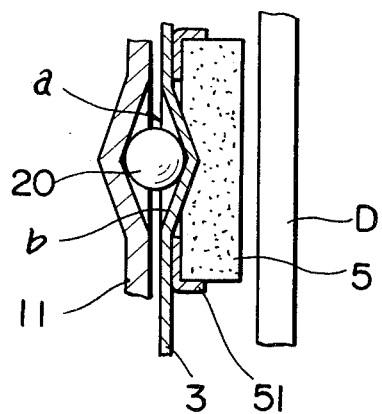
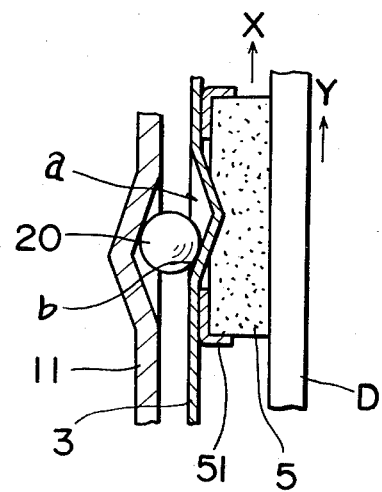

DISC BRAKE FOR A BICYCLE

This invention relates to a disc brake for a bicycle or the like.

Conventionally, this kind of disc brake is widely used for an automobile and other vehicles inclusive of a bicycle, which disc brake is composed of a disc rotatable together with a wheel and pads abutting against the disc so that the pads are pressed in contact with the disc to halt the rotation thereof.

The pads are, as is well known, moved toward the disc hydraulically or mechanically by means of a cam.

The aforesaid hydraulic system, which is widely used for automobiles, is complicated in construction and expensive to manufacture. The mechanical system includes a fixed member of U-like shape having two pads, one of which, opposite one face of the disc, is secured to the fixed member and the other of which, opposite the other face of the disc, is movably mounted to the same in connection with a cam means. The cam means is actuated by swinging arms supported to the fixed member so that the pad is made movable by the cam action. For this purpose, a particular cam means is necessary, and the mechanically operable disc brake becomes complicated in construction and requires many parts resulting in expensive manufacturing costs, as with a hydraulic system.

Furthermore, since the cam means is sized too large to be located between the disc and the wheel, the disc brake, which should be applied with a so-called one-side movable type, has a fixed pad at the wheel side, namely, at the inside of the disc and a movable pad only at the outside so that the fixed member may be moved by use of the reaction of the movable pad in contact with the disc to allow the fixed pad to be brought into contact with the disc. As a result, the disc will become sinuous after a long use; thus, there are such problems as the lower durability of the disc brake and frequent adjustments of the movable pad as well.

This invention has been designed in view of the aforesaid drawbacks of the conventional disc brake. An object of the invention is the provision of a disc brake which does not require many parts, is inexpensive to manufacture, lightly operable in the braking action, and accurate in the braking effect.

The disc brake of the invention is provided with arms, carrying directly thereon respective pads, pivotally supported to a fixed member at both its faces opposite a disc plate, which fixed member interposes therebetween the disc plate rotatable together with a bicycle wheel, wherein the arms freely swing around the pivot in the disc rotary direction and move toward the disc respectively. Also, at least one of the opposite faces of each of the arms and each of the inner surfaces of the fixed member is formed of a recess into which is inserted a rolling member, such as a ball, respectively, the recess having a tapered surface along which the rolling member is adapted to roll. The arms carrying the pads are moved by the ball and the tapered surface so that the pads may be brought into contact with the disc respectively. As a result, a pad displacing mechanism at the disc brake can be reduced in thickness and the pads, which have the disc interposed therebetween, can together be moved to exert the braking action, so that the abovementioned problems in the conventional disc brake are solved. Furthermore, the rotation of the disc is utilized for accelerating the self braking force of the arm to increase or double the braking effect thereby securing an accurate braking action by the disc brake.

These and other objects of the invention will become more apparent in the following detailed description and examples in accordance with the accompanying drawings, in which FIG. 1 is a front view of a disc brake of the invention, FIG. 2 is a side view thereof, FIG. 3 is a cross section of the disc brake taken on line III—III in FIG. 1, FIG. 4 is a sectional view of a principal portion of the disc brake in FIG. 1, and FIG. 5 is a sectional view of the same during braking action.

Referring to FIGS. 1 and 2, the reference numeral 1 designates a fixed member fixed to a bicycle frame F, and a disc D rotatable with a bicycle wheel. The fixed member comprises a main body 11 of a horseshoe-like shape, a bracket 12 for fixing the main body 11 to the frame F, and a support 13. The bracket 12 is fixed to a fork end H of the bicycle frame by means of a lock nut R for securing therethrough a hub shaft A of the wheel W to the fork end H. The support 13 is fixed at its one end to the main body 11 and at the other end to the frame F through a tightening band 2, whereby the main body 11 is rigidly fixed to the frame through the support 13 and the bracket 12.

The reference numerals 3, 3 designate arms which are pivotally supported through pivots 4, 4 to the main body 11 of the fixed member 1 at both inner surfaces thereof opposite the disc, in the relationship that the arms freely swing around the pivots with respect to the fixed member and are laterally movable toward the disc, respectively. The arms carry at their root portion pads 5, 5, held with holders 51, 51 which are fixed to the arms through screw bolts 52, 52 respectively. The arms 3, 3 extend outwardly radially of the disc D and the foremost ends of the extensions are connected through a pin 6 which is inserted between both the ends to be fixed with screw bolts 7, 7. The pivots 4, 4 are secured at each one end thereof to a root portion of the arm and inserted at each other end into bores 11a formed at both the inner surfaces of the main body 11 opposite the disc D, the pivots being rotatable and axially movable with respect to the main body 11 respectively, so that the arms 3, 3 swing around the pivots 4, 4 and travel therethrough toward the disc.

In addition, the pivots 4, 4 may be fixed to the main body 11, where the arms 3, 3 are perforated with bores larger in diameter than the pivots 4, 4 respectively.

The arms 3, 3 are subject to the force applied to the ends of the extensions thereof so as to swing around the pivots 4, 4 in the direction of the arrow X in FIG. 1, i.e., that of forward rotation of the wheel, which is the same as the direction of rotation of the disc D indicated with the arrow Y in FIG. 1.

The swing of the arms is caused by an inner wire 8a and an outer cable 8b, which inner wire 8a is fixed at its one end to the connecting pin 6 through a lock bolt 9 and which outer cable 8b is fixed at its one end to a retainer 10 at the support 13. The inner wire 8a is pulled by operating a control lever (not shown) to allow the arms 3, 3 to swing around the pins 4, 4.

The arms 3, 3 constructed as aforesaid and both the inner surfaces of the fixed member opposite the arms, are, as shown in FIG. 3, formed of recesses a, a, into which balls 20, 20 are accommodated respectively, which recesses have tapered faces b, b at the rear sides with respect to the forward rotation of the arms respectively.

In the aforesaid embodiment of the invention, the recesses a, a are, as seen from FIGS. 3 to 5, formed in a manner that the arms 3, 3 are concaved toward the disc in an obtuse conical shape concentrically of the pads respectively and both the inner surfaces of the fixed member 11 opposite the arms 3, 3 are concaved outwardly of the fixed member in a conical shape symmetrical to the concavity of the arms respectively so that the recesses a, a may be in a one-diagonally broken rhombus-like shape in cross section.

Incidentally the recesses a, a may be formed only at the arms 3, 3 or the fixed member 1, and the tapered faces b, b may be formed to be the faces on which the balls 20, 20 roll during the swing of the arms; namely, the recesses of the arms 3, 3 have the tapered faces b, b, located at the rear side with respect to the arm swing, while the fixed member 1 has those located at the front side in the same direction.

In the aforesaid construction of the disc brake of the invention, when the control lever is operated to pull the inner wire 8a, the arms 3, 3 are allowed to swing around the pivots 4, 4 respectively. As a result, the balls 20, 20 are actuated to allow the arms 3, 3 to be, as shown in FIG. 5, elastically deformed to move the bases thereof mutually toward the disc D, so that the pads 5, 5 are brought into contact with the disc D respectively. The contact of the pads 5, 5 with the disc D conveys the rotary force of the disc D to the arms 3, 3 through pads 5, 5 to cause a further swing of the arms 3, 3 subject to the force from the disc, resulting in the self braking action of the arms; thus, even with a light pull of the wire the braking action becomes greater to lead to secure an accurate braking effect.

In addition to the aforesaid embodiment employing the ball, any suitable roller may be used in place thereof. However, the balls are freely rollable in all the directions so that the disc brake may be advantageously easy to assemble.

As is clearly understood from the abovementioned description, the invention has such advantages that the disc brake is provided with the two arms supported to the fixed member in a relationship that the arms freely swing with respect to the fixed member and are laterally movable toward the disc, which arms directly carry the pads which are displaced toward the disc by means of the swing of the arm. Therefore, a pad-displacing mechanism can be constructed simply and with not many parts so as to be small-sized or thin, whereby the mechanism can be mounted even within a gap defined between the wheel and the disc, and whereby both the pads interposing the disc therebetween are made movable.

Accordingly, it is possible to make the disc brake of the invention inexpensive to manufacture and light in weight as well as capable of eliminating the drawbacks of the conventional one-side-moving system disc brake. Furthermore, the arms are adapted to swing in the same direction as the disc rotation so that when the brake is exerted, the self braking force of the arms may be applied to the disc to increase the braking effect, whereby the disc brake exerts the braking action exactly with a great braking force.

While an embodiment of the invention has been shown and described, the invention is not limited to the specific construction thereof, which is merely exemplified in the specification rather than defined.

What is claimed is:

1. A disc brake for a bicycle or the like, comprising: a disc rotatable with a wheel of the bicycle or the like; a fixed member which has two faces opposite both surfaces of said disc, respectively, and is securable to a frame member of said bicycle or the like; and two arms, between said two faces and said disc, respectively pivoted to said fixed member in the relationship that said arms freely swing with respect to said fixed member and are movable toward said disc, said arms having bases with pads for contact with said two surfaces of said disc, respectively, and extending outwardly radially of said disc to form extensions, respectively, said extensions being subjectable to an external force at their foremost ends thereof, wherein said arms swing around the pivots in the same direction as the forward rotation of said wheel, and at least one of each of said arms and each of said faces of said fixed member opposite thereto is provided with a recess, said recess having a rolling member received therein and being formed of a tapered face at the rear side of said recess with respect to the arm swinging direction so that when an arm swings said rolling member may be rolled along said tapered face to allow said base of said arm to be shifted toward said disc and said pad to be brought into contact with a surface of said disc to thereby exert a braking action.

2. The disc brake according to claim 1, wherein said fixed member is provided with bores at said faces opposite said disc and said arms are provided with pins for pivotally supporting said arms to said fixed member respectively, said pins being axially movably connected in said bores respectively so that said arms may, when swinging, be shifted toward said disc through the pin guidance and said pads may be brought into contact with both said surfaces of said disc respectively to thereby exert the braking action.

3. The disc brake according to claim 1, wherein said fixed member is provided at said faces opposite said disc with short pins fixed to said faces and extending toward said disc respectively, and said arms are provided with bores larger in each diameter than said pins so that said arms may, when swinging, be shifted toward said disc through the pin guidance and said pads may be brought into contact with both said surfaces of said disc respectively to thereby exert the braking action.

4. The disc brake according to claim 1, wherein each said rolling is a ball.

5. The disc brake according to claim 1, wherein each said rolling member is a roller.

6. The disc brake according to claim 1, wherein said fixed member comprises a main body of a horseshoe-like shape, interposing therebetween the outer periphery of said disc, a bracket fixable to a hub shaft supporting therewith the wheel of the bicycle or the like, and a support extending from the top of said main body and being fixable to the frame member of the bicycle or the like.

7. The disc brake according to claim 1, further including a means for allowing said arms to swing in the same direction as the forward rotation of the wheel, said means comprising an inner wire and an outer cable, said inner wire being fixed at one end thereof to said forward ends of said extensions of said arms, and said outer cable being fixable at one end thereof to said fixed member, so that said arms may swing by a pull of said inner wire.

* * * * *